United States Patent
Hahn

(10) Patent No.: US 8,422,974 B2
(45) Date of Patent: Apr. 16, 2013

(54) NOISE CANCELLATION FOR ANTENNA MODULE

(75) Inventor: Wilhelm Steffen Hahn, Los Altos, CA (US)

(73) Assignee: Intersil Americas Inc., Milpitas, CA (US)

( * ) Notice: Subject to any disclaimer, the term of this patent is extended or adjusted under 35 U.S.C. 154(b) by 577 days.

(21) Appl. No.: 12/544,860

(22) Filed: Aug. 20, 2009

(65) Prior Publication Data

US 2010/0048156 A1    Feb. 25, 2010

Related U.S. Application Data

(60) Provisional application No. 61/090,872, filed on Aug. 21, 2008.

(51) Int. Cl.
H04B 1/10        (2006.01)

(52) U.S. Cl.
USPC ............... 455/296; 455/234.1; 455/239.1; 455/245.1; 455/309; 375/146; 375/219

(58) Field of Classification Search ........... 455/424, 455/425, 456.5, 456.6, 561, 550.1, 575.1, 455/566, 63.1, 67.13, 73, 575.5, 575.7, 575.8, 455/283, 284, 273; 343/851; 375/259, 346
See application file for complete search history.

(56) References Cited

U.S. PATENT DOCUMENTS

| | | | | |
|---|---|---|---|---|
| 4,177,430 A * | 12/1979 | Paul | ............................. | 455/306 |
| 4,545,244 A * | 10/1985 | Yasuda et al. | ................... | 73/195 |
| 4,658,256 A * | 4/1987 | Piele | ............................. | 342/383 |
| 4,891,649 A * | 1/1990 | Labaar et al. | ................... | 342/203 |
| 4,996,484 A * | 2/1991 | Spies | ............................. | 324/334 |
| 5,189,415 A * | 2/1993 | Shimada et al. | ........... | 340/854.6 |
| 5,428,832 A | 6/1995 | Nohara et al. | | |
| 5,699,045 A * | 12/1997 | Frederick et al. | ............. | 340/551 |
| 5,812,673 A * | 9/1998 | Nohara et al. | ................... | 381/13 |
| 6,040,728 A | 3/2000 | Nelson et al. | | |
| 6,091,366 A | 7/2000 | Zhang | | |
| 6,385,435 B1 | 5/2002 | Lee | | |
| 6,567,648 B1 * | 5/2003 | Ahn et al. | ....................... | 455/83 |
| 6,590,528 B1 * | 7/2003 | DeWulf | ................... | 342/357.63 |
| 7,035,361 B2 | 4/2006 | Kim et al. | | |
| 7,050,388 B2 | 5/2006 | Kim | | |
| 7,123,676 B2 | 10/2006 | Gebara | | |
| 7,173,551 B2 | 2/2007 | Vrazel | | |
| 7,215,721 B2 | 5/2007 | Hietala | | |
| 7,366,244 B2 * | 4/2008 | Gebara et al. | ................. | 375/259 |
| 7,373,129 B2 * | 5/2008 | Fukuda et al. | ................ | 455/296 |
| 7,522,883 B2 * | 4/2009 | Gebara et al. | ................ | 455/63.1 |

(Continued)

FOREIGN PATENT DOCUMENTS

JP      2001-004736       1/2001
WO     WO 0026856    *  5/2000

*Primary Examiner* — Hai Nguyen

(74) *Attorney, Agent, or Firm* — King & Spalding

(57) ABSTRACT

An antenna module with a detector and an associated canceller is disclosed. The detector may also detect interference and spurs. In one embodiment, an antenna module can include: an antenna configured to receive an electromagnetic signal in a signal path; an amplifier configured to amplify the received electromagnetic signal, and to provide the amplified signal at a first node; a filter configured to receive the amplified signal from the first node, and to provide a filtered signal output therefrom; and a noise canceller and a detector integrated in the signal path at the first node.

20 Claims, 5 Drawing Sheets

U.S. PATENT DOCUMENTS

| | | | |
|---|---|---|---|
| 7,555,218 B2* | 6/2009 | Hayashi | 398/136 |
| 7,602,865 B2* | 10/2009 | Choi | 375/345 |
| 7,657,228 B2* | 2/2010 | Rubin et al. | 455/63.1 |
| 7,676,206 B2* | 3/2010 | Ragan et al. | 455/232.1 |
| 7,796,943 B2* | 9/2010 | Levan | 455/40 |
| 7,885,628 B2* | 2/2011 | Kobayashi | 455/296 |
| 7,894,779 B2* | 2/2011 | Meiyappan et al. | 455/83 |
| 7,924,226 B2* | 4/2011 | Soler Castany et al. | 343/700 MS |
| 8,010,046 B2* | 8/2011 | Goto | 455/41.1 |
| 8,086,205 B2* | 12/2011 | Thomas et al. | 455/296 |
| 8,140,028 B2* | 3/2012 | Balteanu et al. | 455/102 |
| 2003/0086480 A1* | 5/2003 | Park et al. | 375/146 |
| 2004/0213354 A1 | 10/2004 | Jones | |
| 2006/0068735 A1* | 3/2006 | Toyoda et al. | 455/234.1 |
| 2006/0203751 A1* | 9/2006 | Dutertre et al. | 370/278 |
| 2006/0261818 A1* | 11/2006 | Zank et al. | 324/457 |
| 2007/0060059 A1 | 3/2007 | Kim | |
| 2007/0063875 A1* | 3/2007 | Hoffberg | 340/995.1 |
| 2007/0064923 A1 | 3/2007 | Schmukler | |
| 2007/0201588 A1* | 8/2007 | Loiseau et al. | 375/346 |
| 2008/0012575 A1 | 1/2008 | Ebert | |
| 2008/0102760 A1* | 5/2008 | McConnell et al. | 455/73 |
| 2008/0167073 A1* | 7/2008 | Hobson et al. | 455/557 |
| 2008/0240209 A1* | 10/2008 | Levan | 375/218 |
| 2008/0274709 A1* | 11/2008 | Goto | 455/205 |
| 2009/0016545 A1 | 1/2009 | Stelliga | |
| 2009/0036085 A1* | 2/2009 | Kobayashi | 455/296 |
| 2009/0042522 A1* | 2/2009 | Sakai et al. | 455/129 |
| 2009/0254218 A1* | 10/2009 | Sandin et al. | 700/258 |
| 2009/0305742 A1* | 12/2009 | Caballero et al. | 455/566 |
| 2011/0004276 A1* | 1/2011 | Blair et al. | 607/60 |
| 2011/0051670 A1* | 3/2011 | Safarian et al. | 370/328 |
| 2011/0102241 A1* | 5/2011 | Stewart et al. | 342/104 |
| 2011/0212692 A1* | 9/2011 | Hahn et al. | 455/63.1 |

* cited by examiner

NOISE CANCELLATION FOR ANTENNA MODULE

REFERENCE TO RELATED APPLICATIONS

This application claims priority from Provisional U.S. Patent Application 61/090,872 "Noise Cancellation for GPS Antenna Module", by Wilhelm Steffen Hahn, filed on Aug. 21, 2008, and which is incorporated herein by reference for all purposes.

BACKGROUND

Portable computing or electronic devices typically include antennas that are tuned to receive signals having certain frequencies. However, electromagnetic interference (EMI) disturbances emitted from external and/or internal sources can affect electrical circuits due to electromagnetic radiation. Such disturbances may interrupt, obstruct, or otherwise degrade or limit effective circuit performance. Thus, circuits in electronic devices, such as global positioning system (GPS) receivers, phones, personal digital assistants (PDAs), small computers, e-mail devices, audio players, video players, etc., should be protected from potentially harmful EMI.

SUMMARY

An antenna module with a detector and an associated canceller is disclosed. The detector may also detect interference and spurs. In one embodiment, an antenna module can include: an antenna configured to receive an electromagnetic signal in a signal path; an amplifier configured to amplify the received electromagnetic signal, and to provide the amplified signal at a first node; a filter configured to receive the amplified signal from the first node, and to provide a filtered signal output therefrom; and a noise canceller and a detector integrated in the signal path at the first node.

In one embodiment, a method of canceling noise using integrated components in an antenna module can include: receiving an electromagnetic signal for a signal path; amplifying and filtering the received signal to provide an amplified signal; detecting noise in a separate signal path; canceling the detected noise from the signal path; and filtering the signal path. The amplifying and the detecting may also include filtering. Further, the detecting may also include interference and/or spurs detection.

In one embodiment, an antenna module can include: an antenna configured to receive an electromagnetic signal in a signal path; and a noise canceller with detector configured to cancel noise from the received electromagnetic signal in the signal path. The detection and cancellation may also address interference and/or spurs in the received signal.

DETAILED DESCRIPTION

Particular embodiments can allow for noise, interference, and/or spurs cancellation in an antenna module. A passive antenna module may become activated when an associated amplifier is utilized. Because a noise canceller and detector can be added to an antenna module without substantial redesign of an associated printed-circuit board (PCB) or other circuit connector, relatively short time-to-market (TTM), and relatively high ease of use can be attained due to previous placement of the detector.

Figure 1:
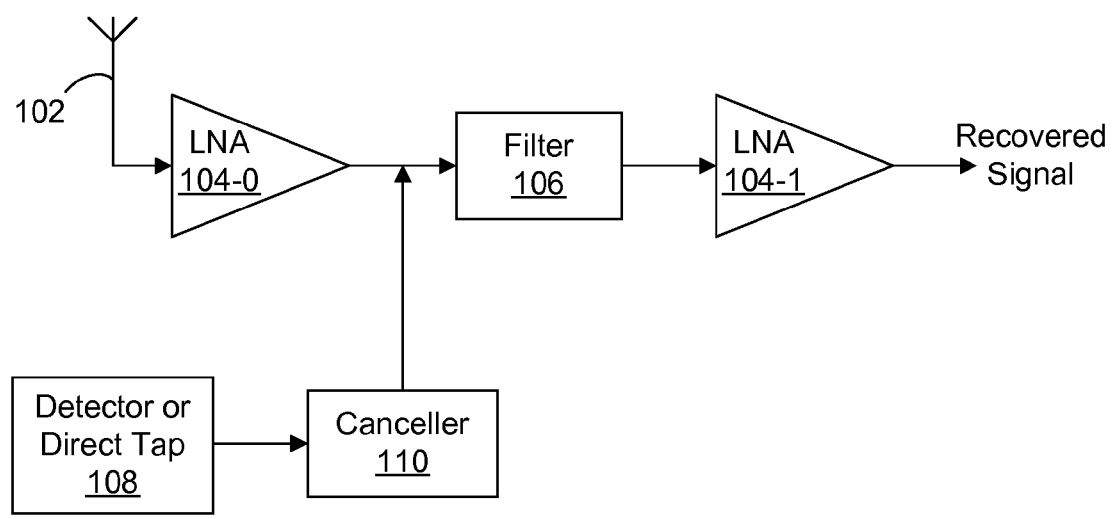
FIG. 1 is a block schematic diagram showing an example canceller antenna arrangement.

Referring now to FIG. 1, shown is a block schematic diagram 100 of an example receiver using a noise canceller. In this particular application, an antenna module used in, e.g., the global positioning system (GPS) can include a patch antenna 102 that receives an electromagnetic signal, and provides a received signal to a first LNA 104-0. A filter 106 (e.g., a surface acoustic wave (SAW) filter, a bandpass filter, etc.) can receive an amplified signal from the first LNA, and provide a signal to a second LNA 104-1 for coupling the recovered signal to a coaxial cable.

Of course, many variations of the particular example shown in FIG. 1 may be found in certain embodiments. For example, multiple or different types of filters, other types of amplifiers, ordering of filter and amplifier devices or components, as well as different connection points (e.g., along a radio frequency (RF) signal path) for the noise canceller and detector can be selected. In one example, the active GPS antenna may not include the second LNA, but rather the second LNA may be part of an RF integrated circuit (RF-IC) on a main PCB or other circuit connector. In other examples, other types of circuitry for amplification and/or other functions can be used. Further, the detector and noise canceller as described herein can also detect and cancel interference, transmitter signals, and/or spurs. In some cases, a direct tap (e.g., to ground or VCC) can be used instead, or in addition, to the detector.

In particular embodiments, an active GPS noise canceller antenna structure can include a noise canceller 110 and detector or direct tap 108 that are mated to, otherwise integrated with, or otherwise associated with, the antenna module. Thus, a standalone module can be created with an appropriate detector, such as an ultrathin detector (UTD), added to an active antenna. The noise canceller 110 with detector 108 may be placed in close proximity or as close as possible to the active antenna, such as in an arrangement on or with a common circuit connector (e.g., a rigid PCB, a flexible PCB, Kapton or other polyimide film, or other suitable connector, etc.) as the active/patch antenna. Further, the noise canceller can be placed under a shield covering the active devices (e.g., LNA, switches, etc.) of the antenna module, with the detector on top of, or on side of, the shield. Such placement can ensure good correlation between associated noise signatures, resulting in good cancellation.

A bus (e.g., a serial peripheral interface (SPI), a universal serial bus (USB), inter-integrated circuit bus ($I^2C$), etc.) may be used for communication to another component in order to optimize cancellation. Alternatively, a fixed setting may be stored in local memory, such as a nonvolatile type of memory (e.g., EEPROM flash memory, etc.) of an associated host system such that setting information can be downloaded into the device. Such a fixed setting can include information (e.g., gain, absolute temperature, temperature coefficient, etc.) about frequencies or other signal characteristics for cancellation. Alternatively, such memory (e.g., flash memory) may be located inside the noise detection and cancelling module, or be contained in the noise canceller IC itself.

In any event, the noise canceller may be connected to a standard GPS, GSM, MTV, DARS, WLAN or WiMax chip/chipset, such as any available from MediaTEK, SiRF, Epson, Broadcom, Qualcom, Marvell, Dibcom, Megachips, etc., such that the antenna and the LNA are relatively close together. Such a configuration provides low losses while retaining good reception. The antenna module can be used in any suitable receiver application (e.g., DARS, GPS, Satellite television (e.g., Astra, Intelsat, Eutelsat, etc.), etc.).

Figure 2:
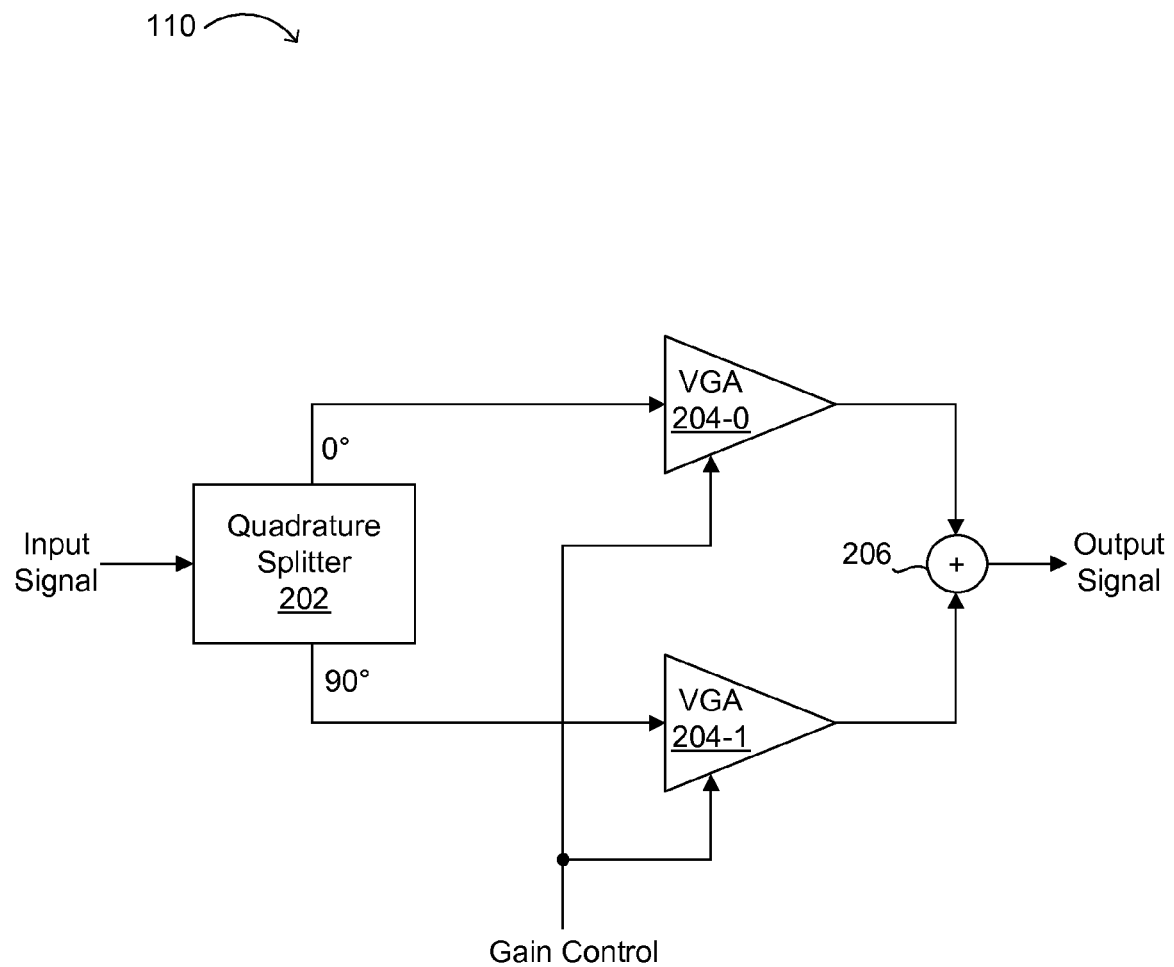
FIG. 2 is a block schematic diagram of an example noise canceller structure.

Referring now to FIG. 2, shown is a block schematic diagram 110 of an example noise canceller structure. In this example, noise canceller 110 can be implemented as an IQ modulator that splits an input signal via quadrature splitter 202 into two separate signals, including an In-phase (I) signal and a Quadrature (Q) signal, that are approximately ninety degrees out of phase. The signals (I, Q) output from quadrature splitter 202 are said to be in quadrature. Quadrature splitter 202 may be implemented via various types of circuits, such as an LC, RC, LR, capacitive only, allpass, or polyphase filter.

The (I) signal is input to a first controllable amplifier (e.g., variable gain amplifier (VGA) 204-0), and the (Q) signal is input to a second controllable amplifier VGA 204-1, the outputs of which are added via summation circuit 206, yielding a phase-shifted and amplified signal as output. The adjustable amplifiers VGA 204 may be implemented via voltage controlled analog amplifiers, digitally controlled switch type amplifiers, or other suitable controllable amplifiers. Note that one or more of the amplifiers VGA 204 may be non-controllable, and/or a separate variable gain stage may be added before and/or after the IQ modulator, without departing from the scope of the present teachings. Such a variable gain stage before the IQ modulator can provide coarse gain control (e.g., 0 dB, 5 dB, 10 dB, 15 dB, etc.), with finer gain controls via gain control/VGAs 204.

Figure 3:
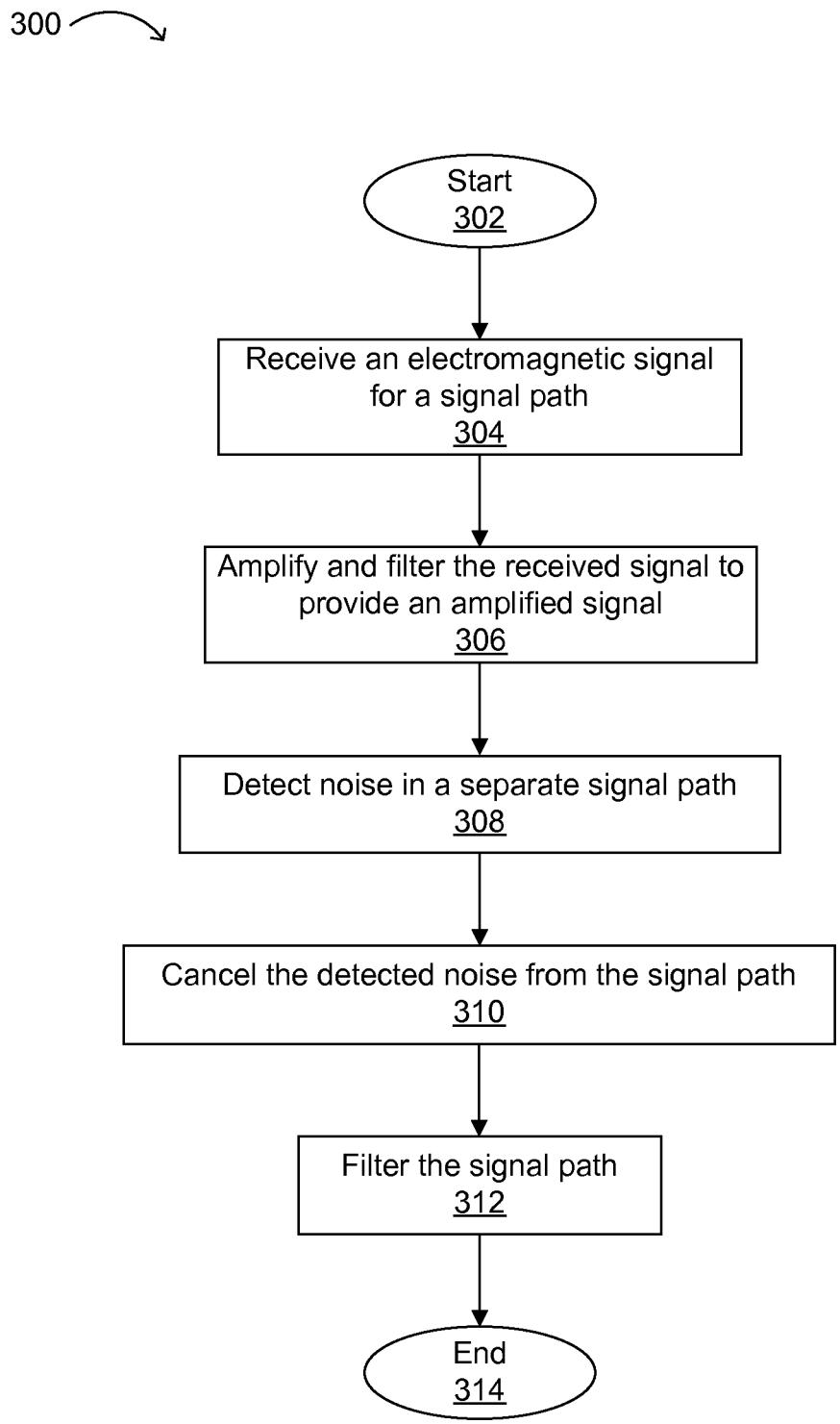
FIG. 3 is a flow diagram of an example method of canceling noise using integrated components in an active antenna module.

Referring now to FIG. 3, shown is flow diagram 300 of an example method of canceling noise using integrated components in an active antenna module. The flow begins (302), and an electromagnetic signal can be received for a signal path (304). The received signal can be amplified and filtered signal to provide an amplified signal (306). Noise can be detected in a separate signal path (308). The detected noise can then be canceled from the signal path (310). The signal path can also be filtered (312), completing the flow (314).

Figure 4:
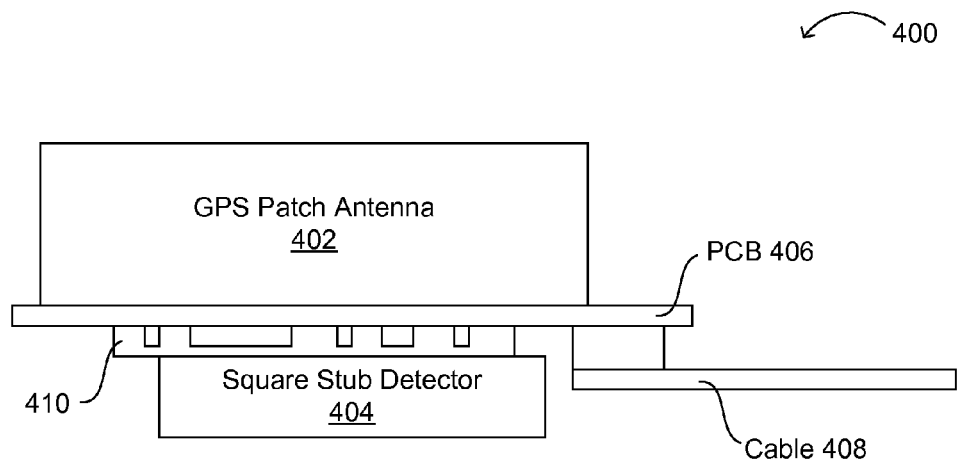
FIG. 4 is a cross-section diagram of a first example canceller antenna structure.

Referring now to FIG. 4, a cross-section diagram of a first example canceller antenna structure 400 is shown. On one side of PCB 406, GPS patch antenna 402 can be located. A noise canceller and detector (e.g., square stub detector 404) can be located on an opposite side of PCB 406 on circuitry 410, as shown. Alternatively, the noise canceller with detector may be mounted at a different angle (e.g., other than about 90°), and on the same or a different side of PCB 406 as the GPS patch antenna 402. The detector can also be placed on a shield covering the active antenna. Further, the detector itself may be partly shielded to modify its reception pattern for particular applications.

When interference comes in from an outside source and is received in GPS patch antenna 402, the best correlation between the interfered signal at the patch antenna and the noise sampling detector can be achieved when they are located very close together. As shown in the particular example of FIG. 4, the patch antenna and the noise sampling detector with canceller may be positioned in very close proximity.

Such a structure can be used to replace an existing antenna module that may not include canceling capability. The detector with noise canceller may be placed on the bottom of the PCB board, such that canceling capability is included in the antenna structure. Thus, a normal operating antenna (e.g., GPS) can be replaced with the structure as described herein. In this fashion, a level of integration including an active antenna portion and associated noise cancellation circuitry is achieved in a single module.

Figure 5:
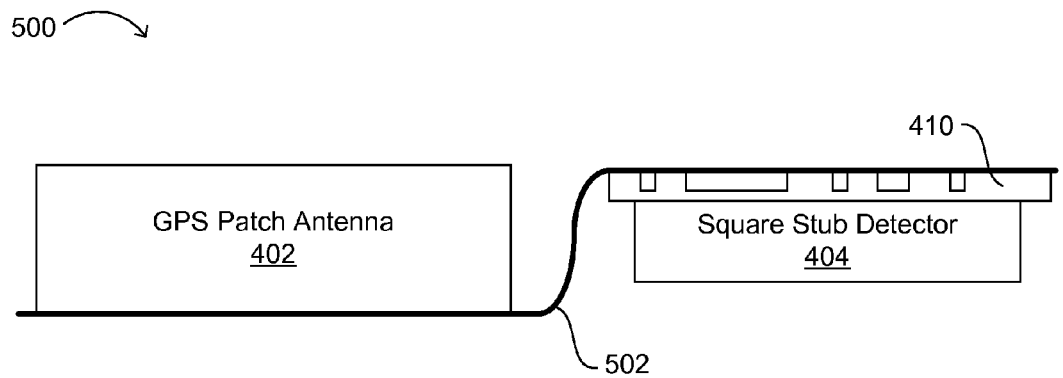
FIG. 5 is a cross-section diagram of a second example canceller antenna structure.
Figure 6:
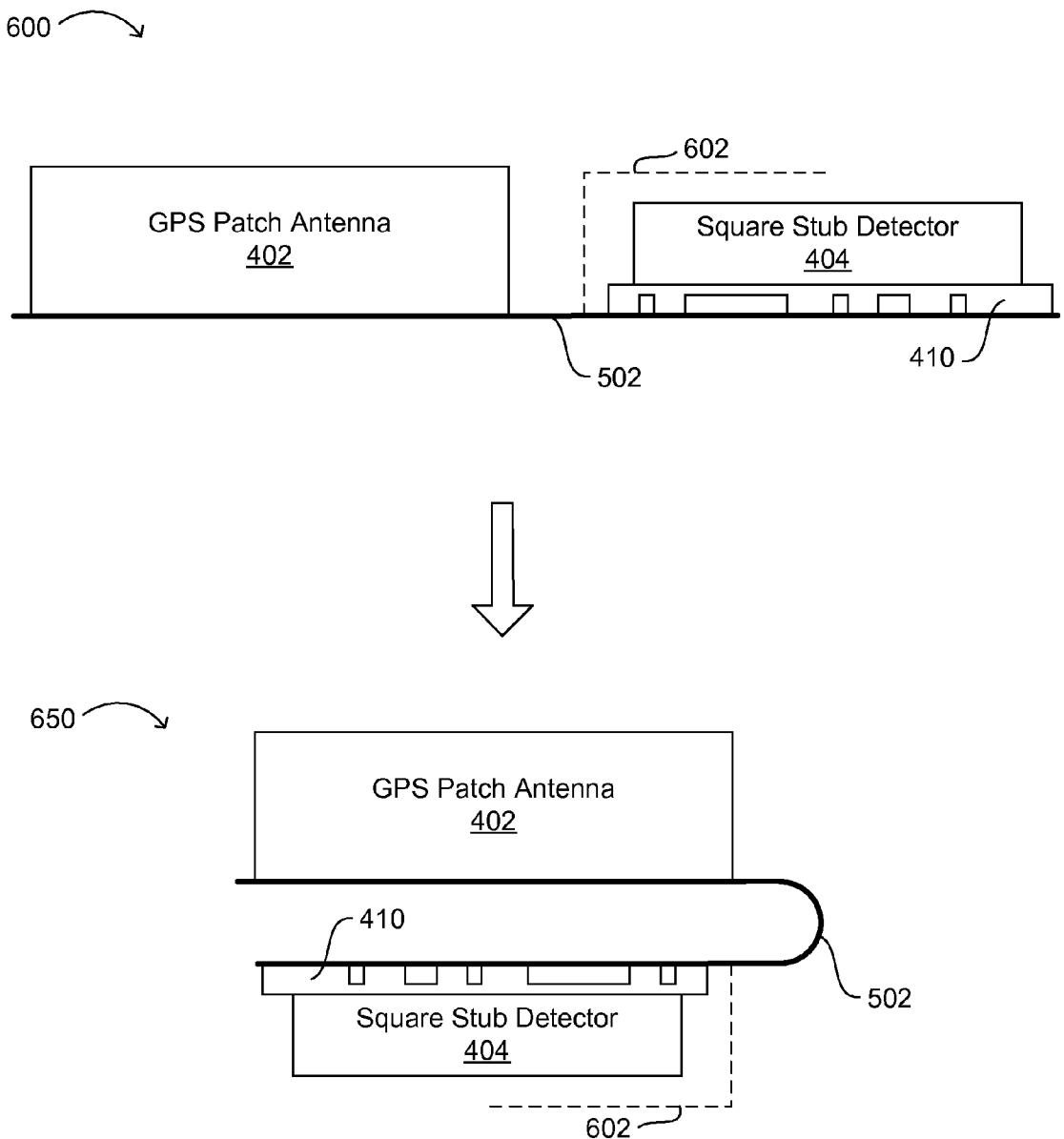
FIG. 6 is a cross-section diagram of a third example canceller antenna structure.

Referring now to FIGS. 5 and 6, other example cross-section diagrams of example canceller antenna structures are shown. In the example of FIG. 5 (500), a flexible connector 502 can be used, with GPS patch antenna 402 on one side, and detector 404/circuitry 410 on another side, as shown. Also, flexible connector 502 may have a curve to accommodate connections between patch antenna 402 and detector 404/circuitry 410, and to reduce the height of the module.

In the example of FIG. 6, flexible connector 502 can be relatively flat in arrangement 600 with GPS patch antenna 402 and detector 404/circuitry 410. In addition, shield 602 can be employed to modify the reception pattern of detector 404. In the example arrangement 650, flexible connector 502 allows for a folding under of circuitry 410, detector 404, and shield 602 to accommodate a different form factor.

In one example, GPS patch antenna 402 height can be in a range of from about 3 mm to about 5 mm, the PCB 406 thickness can be about 0.8 mm, other devices (e.g., chipset) may extend from the PCB by about 1 mm, and a square stub detector 404 may range from about 1 mm to about 3.2 mm in height. Also, PCB 406 can have dimensions of about 13 mm by about 17 mm. Flexible connector 502 can be about 50 μm in height, while other rigid connectors can range from about 0.1 mm to about 0.8 mm. Further, cable 408 can connect to PCB 406, and may also have any suitable dimensions.

Of course, other types of detectors, such as UTDs, can be used to reduce the overall structure height. The noise canceller with detector can be secured to the PCB, other circuit connector, or shield by using any suitable adhesive (e.g., sticky tape, double stick tape, gluing, etc.). Further, the antenna can also be repositioned and a tap-in or other placement of the detector and noise canceller can be accommodated. In addition, the folding as shown in the example of FIG. 6 can result in the detector and noise canceller being underneath the antenna (e.g., a fold of about 180°), perpendicular to the antenna (e.g., a fold of about 90°), or in any suitable position.

Thus in particular embodiments, GPS antenna module can include a detector, and a noise canceller coupled to the detector and inserted in the signal path. As described herein, an active antenna with integrated noise canceller and noise sampling detector can be provided.

Although particular embodiments of the invention have been described, variations of such embodiments are possible and are within the scope of the invention. For example, although specific memory types, memory structures, and protocols have been described, other types of memories, configurations or types of buses, and/or devices, can be accommodated in accordance with embodiments of the present invention. Also, applications other than portable computing devices or the like can also be accommodated in accordance with particular embodiments. Embodiments of the invention can also operate among any one or more processes or entities including users, devices, functional systems, and/or combinations of hardware and software.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer-readable medium can be, by way of example only but not by limitation, an electronic, magnetic, optical, or a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. For example, distributed, networked systems, components and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:
1. An antenna module, comprising:
an antenna placed on a circuit connector and configured to receive an electromagnetic signal in a signal path;

an amplifier configured to amplify the received electromagnetic signal and provide the amplified signal at a first node;
a detector placed on the circuit connector with the antenna to correlate an interference signal associated with the received electromagnetic signal;
a noise canceller coupled to the detector, the noise canceller configured to cancel the interference signal from the amplified signal at the first node, to provide an interference-cancelled amplified signal; and
a filter configured to receive the interference-cancelled amplified signal and provide a filtered signal output.

2. The antenna module of claim 1, wherein the circuit connector comprises at least one of a rigid printed-circuit board (PCB) and a flexible connector.

3. The antenna module of claim 1, wherein the detector comprises a stub detector, and the noise canceller is further configured to cancel detected interference and spurs.

4. The antenna module of claim 1, wherein the noise canceller comprises:
a quadrature splitter configured to receive an input signal and to provide first and second split signals;
a first controllable amplifier configured to receive the first split signal, and to provide a first split amplified signal therefrom;
a second controllable amplifier configured to receive the second split signal, and to provide a second split amplified signal therefrom;
a summation circuit configured to receive the first and second split amplified signals, and to provide an output signal therefrom; and
one or more controllable amplifiers before the quadrature splitter and/or after the summation circuit.

5. The antenna module of claim 4, wherein
the first split signal is in-phase with the input signal, and
the second split signal is a quadrature signal relative to the input signal.

6. The antenna module of claim 1, wherein
the detector comprises an ultrathin detector (UTD), and
the antenna module further comprises a shield that modifies a reception pattern of the ultrathin detector.

7. A method of canceling noise using integrated components in an active antenna module, the method comprising:
receiving, by an antenna placed on a circuit connector, an electromagnetic signal in a signal path;
amplifying and filtering the received electromagnetic signal to provide an amplified signal;
detecting, by a detector placed on the circuit connector, noise, spurs, or other interference to correlate an interference signal received by the antenna;
canceling, by a noise canceller coupled to the detector, the interference signals from the amplified signal at the first node, to provide an interference-cancelled amplified signal; and
filtering the interference-cancelled amplified signal.

8. The method of claim 7, wherein the canceling further comprises using a canceller circuit to phase shift, amplify, and sum the detected noise.

9. An antenna module, comprising:
an antenna placed on a circuit connector and configured to receive an electromagnetic signal in a signal path;
circuitry placed on the circuit connector and configured to amplify the received electromagnetic signal and provide an amplified signal;
a noise canceller and detector placed on the circuitry and configured to detect noise associated with the received electromagnetic signal and cancel the noise from the amplified signal, to provide an interference-cancelled amplified signal; and
a filter configured to receive the interference-cancelled amplified signal and provide a filtered signal output.

10. The antenna module of claim 9, wherein the noise canceller comprises:
a quadrature splitter configured to receive an input signal and to provide first and second split signals;
a first controllable amplifier configured to receive the first split signal, and to provide a first split amplified signal therefrom;
a second controllable amplifier configured to receive the second split signal, and to provide a second split amplified signal therefrom; and
a summation circuit configured to receive the first and second split amplified signals, and to provide an output signal therefrom.

11. The antenna module of claim 10, wherein
the first split signal is in-phase with the input signal, and
the second split signal is a quadrature signal relative to the input signal.

12. The antenna module of claim 10, further comprising a variable gain amplifier coupled to the input signal.

13. The antenna module of claim 10, further comprising a variable gain amplifier coupled to the output signal.

14. The antenna module of claim 9, wherein the circuit connector comprises a printed-circuit board (PCB), the antenna being located on a first side of the PCB, the noise canceller with detector being located on a second side of the PCB, the second side being opposite the first side.

15. The antenna module of claim 9, wherein the circuit connector comprises at least one of a PCB and a flexible connector, the antenna and the noise canceller with detector being located on a same side of the circuit connector.

16. The antenna module of claim 15, further comprising a shield at least partly covering the noise canceller with detector, wherein the reception pattern of the detector is modified by the shield.

17. The antenna module of claim 9, wherein the antenna is located on a first side of the circuit connector, and the noise canceller with detector is located on a second side of the circuit connector, the second side being opposite the first side, the circuit connector being a flexible connector.

18. The antenna module of claim 17, wherein the noise canceller with detector is inverted with respect to the antenna.

19. The antenna module of claim 17, further comprising a shield at least partly covering the detector to change a directivity of the detector.

20. The antenna module of claim 17, wherein the flexible connector is configured to be bent such that the noise canceller with detector folds with respect to the antenna.

* * * * *